(12) United States Patent
Wakefield

(10) Patent No.: US 6,178,054 B1
(45) Date of Patent: Jan. 23, 2001

(54) SELECTING WRITE FAULT THRESHOLDS BY HEAD AND DISC LOCATION IN A DISC DRIVE

(75) Inventor: Shawn A. Wakefield, Norman, OK (US)

(73) Assignee: Seagate Technology LLC, Scotts Valley, CA (US)

( * ) Notice: Under 35 U.S.C. 154(b), the term of this patent shall be extended for 0 days.

(21) Appl. No.: 09/160,945

(22) Filed: Sep. 25, 1998

Related U.S. Application Data

(60) Provisional application No. 60/088,058, filed on Jun. 5, 1998, and provisional application No. 60/088,051, filed on Jun. 5, 1998.

(51) Int. Cl.[7] ................................................. G11B 27/36
(52) U.S. Cl. ..................................... 360/31; 53/46; 53/60
(58) Field of Search .............................. 360/53, 31, 46, 360/67, 68, 48, 77.02, 60

(56) References Cited

U.S. PATENT DOCUMENTS

| | | |
|---|---|---|
| 4,799,112 | 1/1989 | Bremmer et al. . |
| 4,821,125 | 4/1989 | Christensen et al. . |
| 5,047,876 | 9/1991 | Holsinger . |
| 5,107,378 | 4/1992 | Cronch et al. . |
| 5,262,907 | 11/1993 | Duffy et al. . |
| 5,408,367 | 4/1995 | Emo . |
| 5,530,705 | 6/1996 | Malone, Sr. . |
| 5,687,036 | 11/1997 | Kassab . |
| 5,774,285 | 6/1998 | Kassab et al. . |
| 5,995,305 | * 11/1999 | McNeil et al. ......................... 360/31 |

* cited by examiner

Primary Examiner—Alan T. Faber
(74) Attorney, Agent, or Firm—Crowe & Dunlevy

(57) ABSTRACT

A method is disclosed for optimizing write performance of a disc drive through the selection of optimum write thresholds. The disc drive has a controllably positionable head adjacent tracks defined on a recording surface of a rotatable disc. A narrow head detection test is first applied whereby data are written to a selected track while maintaining the head at a first off-track center distance. The data are read while maintaining the head at a position nominally over the center of the selected track and measuring resulting read error performance. These steps are then repeated using a second off-track center distance. A wide head detection test is next applied, by writing data to the selected track while maintaining the head over the center of the selected track, writing data to an adjacent track abutting the selected track while maintaining the head at a third off-track center distance, and reading the data while maintaining the head over the center of the selected track and measuring resulting read error performance. These steps are then repeated using a fourth off-track center distance. The optimum write thresholds are thereafter selected from the measured read error rates.

7 Claims, 7 Drawing Sheets

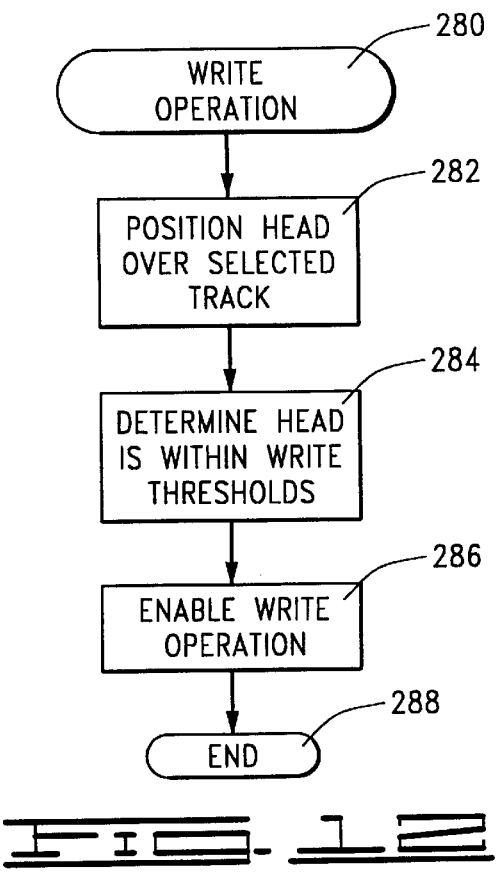
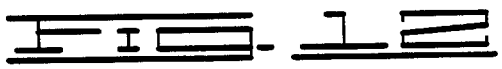
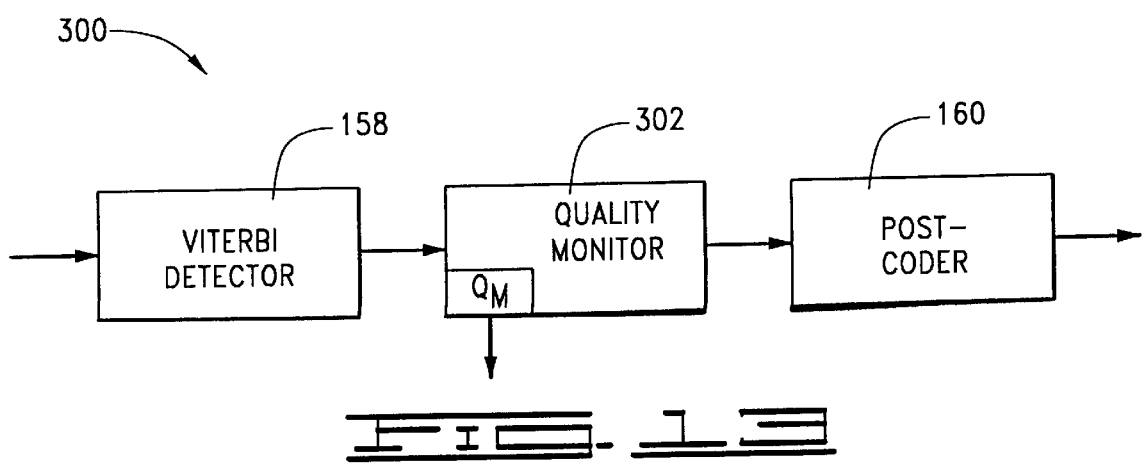
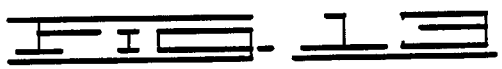

SELECTING WRITE FAULT THRESHOLDS BY HEAD AND DISC LOCATION IN A DISC DRIVE

RELATED APPLICATIONS

This application claims priority to United States Provisional Applications No. 60/088,058 entitled WRITE FAULT THRESHOLDS ADAPTIVE BY RADIUS, and 60/088,051 entitled ADAPTIVE WRITE FAULT THRESHOLDS BY HEAD, both filed Jun. 5, 1998, and is related to U.S. patent application Ser. No. 09/161,105 entitled WRITE FAULT THRESHOLDS ADAPTIVE BY HEAD AND DISC LOCATION IN A DISC DRIVE, filed on even date herewith.

FIELD OF THE INVENTION

This invention relates generally to the field of disc drive storage devices, and more particularly, but not by way of limitation, to improving data transfer performance of a disc drive using write fault thresholds that are adapted to each particular head and disc location.

BACKGROUND OF THE INVENTION

Disc drives are digital data storage devices which utilize one or more rotatable, magnetic discs to store and retrieve computer data. A plurality of controllably positionable read/write heads are used to selectively magnetize tracks on the disc surfaces to store the data, and to transduce the selective magnetization of the tracks to retrieve the data to a host computer in which the disc drive is mounted.

Typically, each track includes a number of servo fields which are periodically interspersed with user data fields. The user data fields are used to store computer data and the servo fields store prerecorded servo information used by a disc drive servo system to control the position of the heads.

The servo system operates in two primary modes: seeking and track following. During a seek, a selected head is moved from an initial track to a destination track on the corresponding disc surface. Generally, a velocity profile defines a desired velocity trajectory for the head as the head is first accelerated and then decelerated to move from the initial track to the destination track. As the head nears the destination track, a settling mode is entered whereby the servo system attempts to settle the head onto the destination track in a minimum amount of time. Thereafter, the servo system switches to the track following mode of operation so that the head is maintained over the destination track until a subsequent head switch or seek operation is performed.

Each head includes a write element to write the data to the tracks and a read element which reads the user data and the servo data from the track. A typical write element comprises a thin film inductive coil having a write gap that, when subjected to a time-varying write current indicative of the data to be stored, generates a corresponding time-varying magnetic field across the gap which selectively magnetizes the tracks. A typical read element construction includes a magneto-resistive (MR) material characterized as having a changed electrical resistance when subjected to a magnetic field of selected orientation. Stored data are recovered by passing a read bias current through the read element and detecting changes in voltage thereacross in response to the magnetization of the tracks. Although head constructions can vary, the effective size of the write element is typically larger (with respect to track width) than the size of the read element, and the effective centers of the read and write elements may be physically offset within the head.

To maintain data integrity and high data transfer rates, it is critical that the read and write elements be respectively maintained as close as practicable over the center of each track during read and write operations. For example, even if data are properly written in a centered relationship over a selected track, attempting to subsequently read the data while the head is positioned a sufficient distance away from the center of the track may result in an unacceptable number of read errors, due to the inability of the read element to properly detect the written data, as well as the potential interference from the selective magnetization of an adjacent track. More significantly, writing data too far away from the track center can prevent subsequent recovery when the head is centered over the track, and can also corrupt data stored on the adjacent track.

Thus, disc drives typically utilize read fault and write fault thresholds to minimize the occurrence of read errors and data overwriting. These thresholds are usually expressed as a percentage of track width and define zones about the center of the tracks in which safe reading and writing can take place. For example, a typical read fault threshold might be established at ±10% of the track width, so that read operations are enabled only while the head is less than 10% of the track width away from the center of the track. Similarly, a typical write fault threshold might be established at ±17%, so that write operations are enabled only while the head is less than 17% away from the center of the track. During read and write operations, the servo system continually monitors the position of the respective elements and causes the interruption of the respective operation if the threshold is reached or exceeded. The thresholds are determined during disc drive design and are intended to balance various factors including track density, acceptable read error rates, expected variations in the sizes of the read and write elements, and acceptable data transfer rates.

It will be recognized that extended read and write operations often involve the accessing of multiple tracks by a single head, and can further involve the accessing of multiple tracks by multiple heads. In order to maximize data transfer performance of a disc drive, it is desirable to begin reading or writing data as soon as the head is sufficiently settled onto each accessed track. In practice, disc drives typically monitor the position of the head as it is settled onto each track and initiate the respective read or write operation as soon as the head is within the respective fault threshold (and the head is over the desired user data field).

Hence, while tightening the read and write fault tolerances of a disc drive would likely result in corresponding improvements in error rate performance by the drive, it would also undesirably degrade the transfer rate performance of the drive, as the drive would have to wait longer to ensure the head is sufficiently settled onto the destination track (and maintained in proper relation thereto) before commencing the respective read or write operation.

Such tightening of the read and write fault thresholds would also place greater strains upon the servo system in maintaining the heads within the defined acceptable read and write zones, likely resulting in a greater number of interruptions in the data transfer process as read and write faults are declared and resolved. Tightening the read and write fault thresholds would also generally result in a reduction of the operational shock performance characteristics of the drive, as the drive would be less tolerant to the application of external shocks and vibrations that tend to move the heads away from the centers of the followed tracks.

Consumer demand for disc drives with ever increasing data storage capacities and transfer rate performance levels has led disc drive manufacturers to attempt to achieve greater data storage densities and read/write channel capabilities in successive generations of drives, including balancing the sometimes conflicting requirements of enhanced error rate and transfer rate performance. Accordingly, it is to the furtherance of these efforts to improve disc drive performance that the present invention is directed.

SUMMARY OF THE INVENTION

The present invention provides an apparatus and method for optimizing disc drive data transfer rate performance through the use of write thresholds that are adaptive by head and by disc location.

As exemplified by a preferred embodiment, a disc drive comprises a head which is controllably positionable adjacent each of a plurality of nominally concentric tracks defined on a rotatable disc, which selectively magnetizes the tracks to write data to the tracks.

A narrow head detection test is first applied whereby data are written to a selected track while maintaining the head at a first off-track center distance. The data are read while maintaining the head at a position nominally over the center of the selected track and measuring resulting read error performance. These steps are then repeated using a second off-track center distance. A wide head detection test is next applied, by writing data to the selected track while maintaining the head over the center of the selected track, writing data to an adjacent track abutting the selected track while maintaining the head at a third off-track center distance, and reading the data while maintaining the head over the center of the selected track and measuring resulting read error performance. These steps are then repeated using a fourth off-track center distance. The optimum write thresholds are thereafter selected from the measured read error rates.

These and various other features as well as advantages which characterize the present invention will be apparent from a reading of the following detailed description and a review of the associated drawings.

BRIEF DESCRIPTION OF THE DRAWINGS

FIG. 9 provides a flow chart for a WRITE THRESHOLD SELECTION routine, representative of programming stored in memory and used by the system processor of FIG. 2 to set the write thresholds for the tracks in accordance with preferred embodiments of the present invention.

FIG. 12 provides a flow chart for a WRITE OPERATION routine, indicative of the steps performed by the disc drive during a write operation using the adaptive write thresholds determined by the routine of FIG. 9.

FIG. 13 shows a portion of a read channel similar to that shown in FIG. 3, illustrating a quality monitor which can be used to obtain data useful in selecting optimum write thresholds for the tracks of the disc drive.

DETAILED DESCRIPTION

Figure 1:
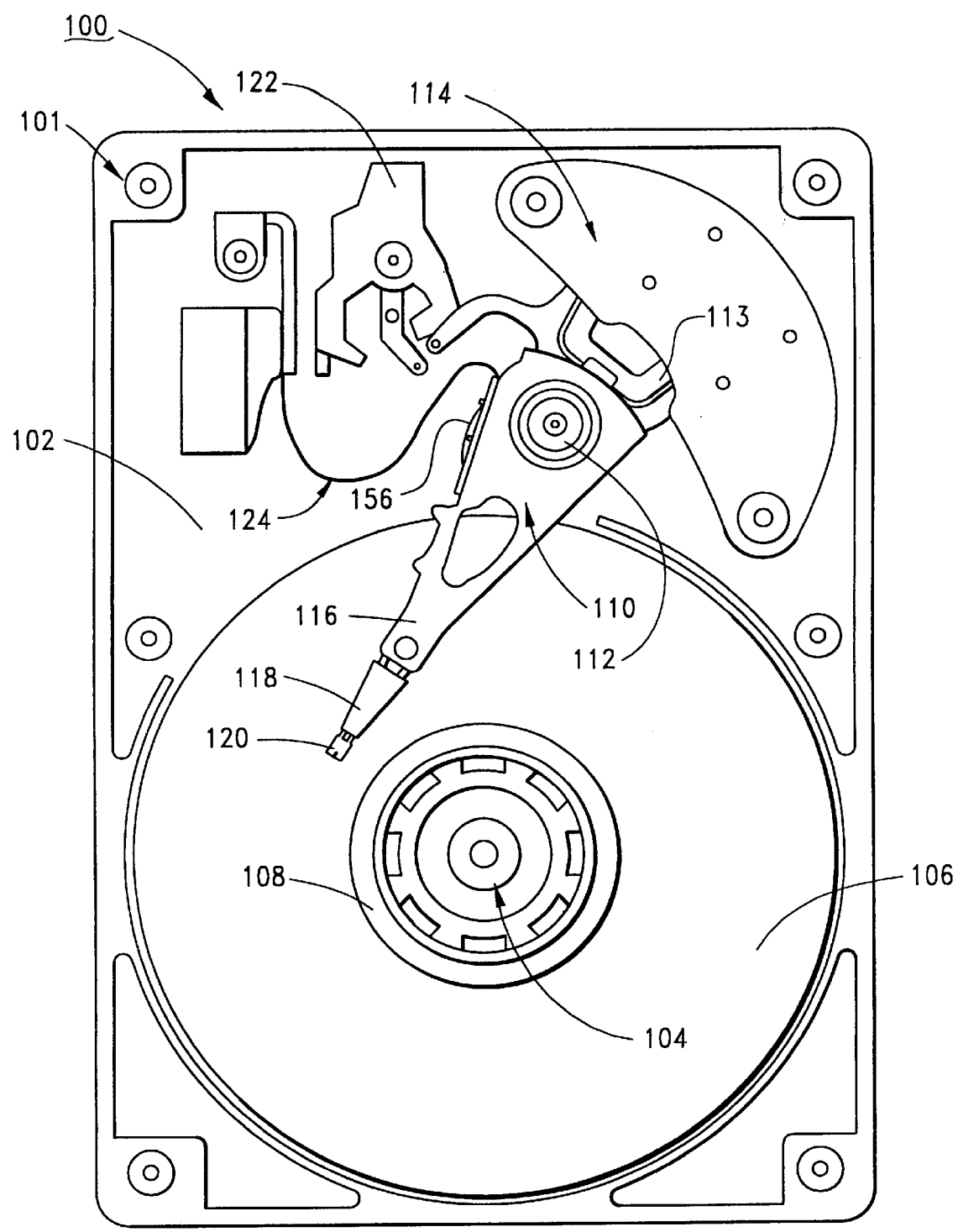
FIG. 1 provides a top plan view of a disc drive constructed in accordance with a preferred embodiment of the present invention.

In order to set forth a detailed description of a preferred embodiment of the present invention, reference is first made to FIG. 1 which shows a top plan view of a disc drive 100 used to store computer data. The disc drive 100 includes a head-disc assembly (HDA) 101 and a printed wiring assembly (PWA) which is mounted to the underside of the HDA (and thus not visible in FIG. 1). The PWA includes electronics used to control the operation of the HDA 101, as discussed below.

A top cover, omitted from FIG. 1 to reveal interior portions of the HDA 101, mates with a base deck 102 of the HDA 101 to provide an environmentally controlled housing. A spindle motor (generally designated at 104) is supported by the base deck 102 and rotates a plurality of discs 106 at a constant high speed. A disc clamp 108 secures the discs 106 to the spindle motor 104.

The discs 106 include recording surfaces (not separately identified) to which user data are written by way of a rotary actuator assembly 110, which rotates about a cartridge bearing assembly 112 in response to the application of current to a coil (113, a portion of which is visible in FIG. 1) of a voice coil motor (VCM) 114. A plurality of rigid arms 116 extend from the actuator assembly 110, each of which supports a corresponding flexible suspension assembly 118. A plurality of heads 120 are supported by the suspension assemblies 118 over the recording surfaces of the discs 106 by air bearings established by air currents set up by the high speed rotation of the discs 106. The heads 120 are preferably characterized as magneto-resistive (MR) heads, each having a thin film inductive write element and an MR read element.

A latch assembly 121 secures the actuator assembly 110 when the disc drive 100 is deactivated, and a flex circuit assembly 124 facilitates electrical interconnection between the actuator assembly 110 and the disc drive PWA.

Figure 2:
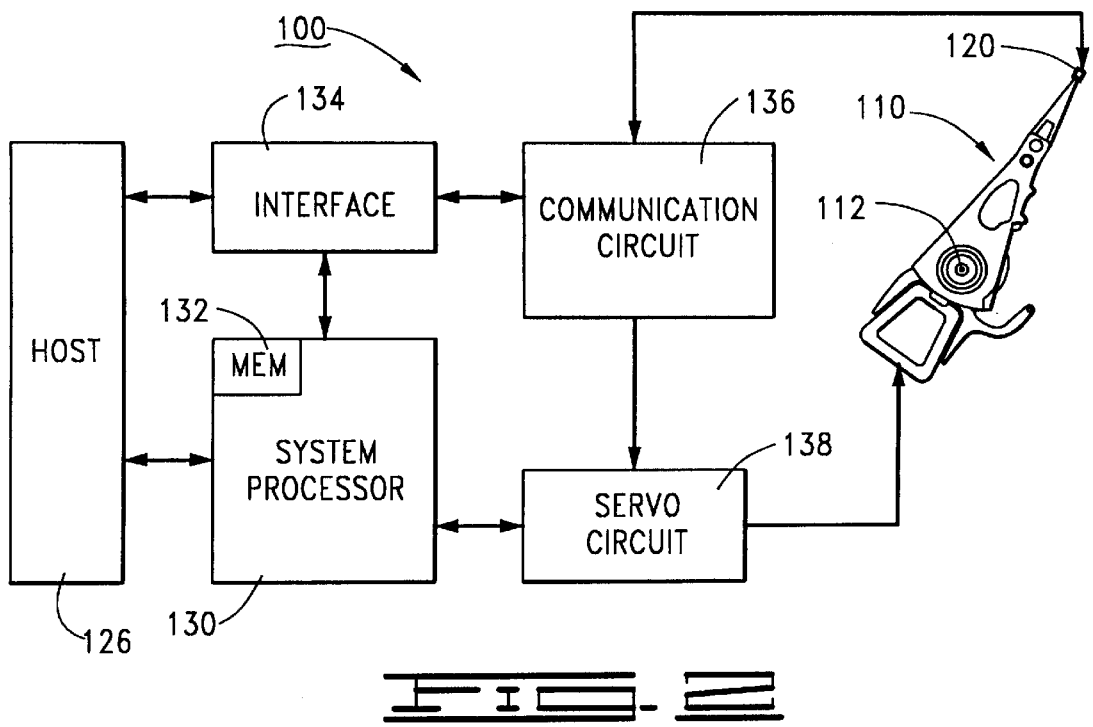
FIG. 2 provides a functional block diagram of relevant portions of the disc drive of FIG. 1.

Referring to FIG. 2, shown therein is a generalized functional block diagram of relevant portions of the disc drive 100 of FIG. 1, including circuitry disposed on the aforementioned disc drive PWA. The disc drive 100 is shown to be operably coupled to a host computer 126 in which the disc drive 100 is mounted.

A system processor 130 provides top level control of the operation of the disc drive 100. Programming and parameter values utilized by the system processor 130 are stored in drive processor memory 132 (MEM), which preferably comprises both volatile and non-volatile memory devices such as dynamic random access memory (DRAM) and flash memory. An interface circuit 134 includes a data buffer (not shown) for the temporary buffering of transferred data, and a sequence controller ("sequencer", also not shown) which directs the operation of the disc drive 100 during data transfer operations.

FIG. 2 further shows a communication circuit 136 operably coupled to the interface circuit 134 and to the head 120, with the communication circuit 136 controlling the transfer of data between the discs 106 and the host computer 126. A servo circuit controls the radial position of the head 120 through the controlled application of current to the coil 113.

Figure 3:
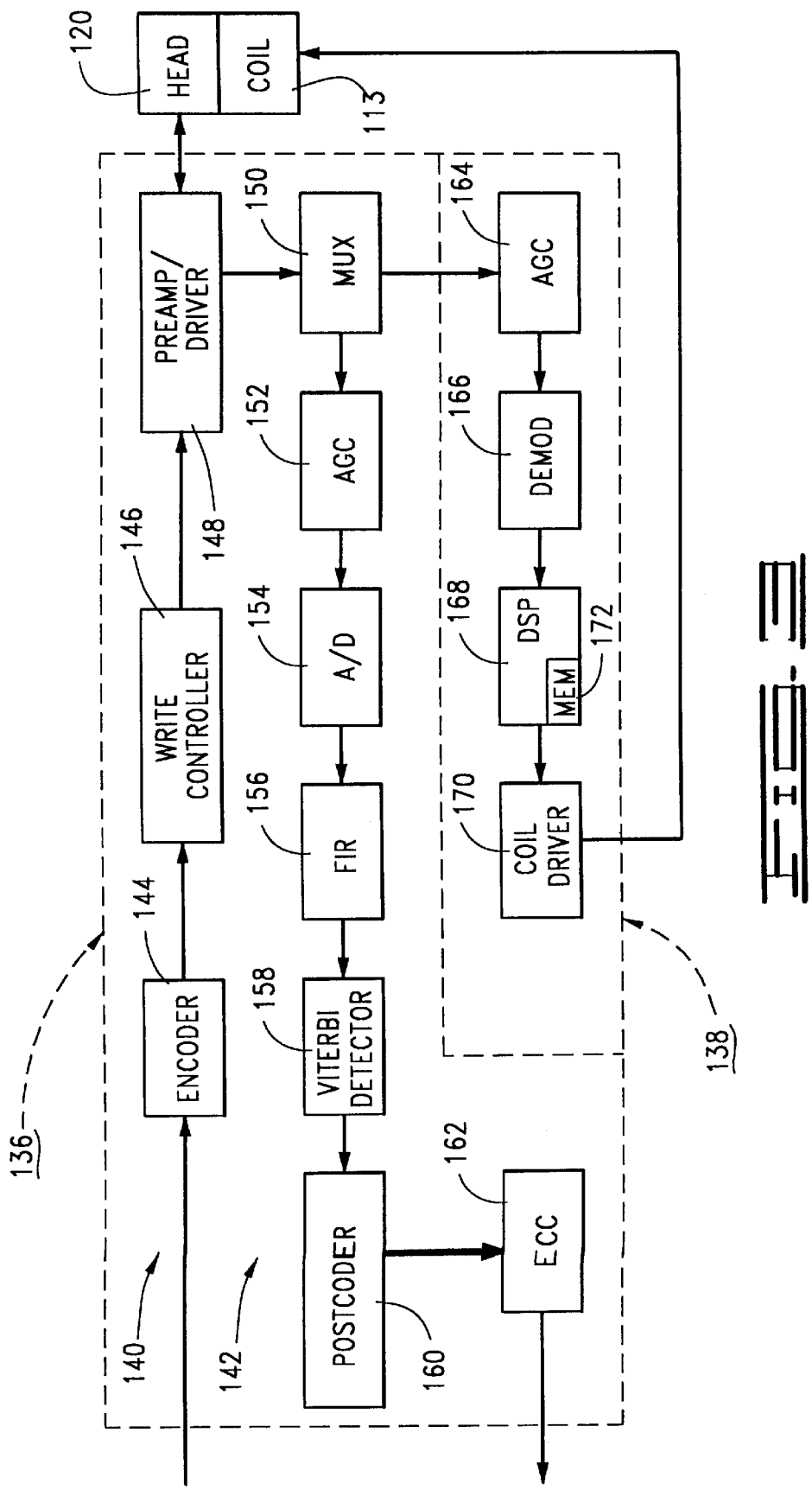
FIG. 3 shows a functional block diagram for the communication circuit and servo circuit of FIG. 2.

FIG. 3 provides a functional block diagram of the communication circuit 136 and the servo circuit 138 of FIG. 2. The communication circuit 136 includes both a write channel (generally designated at 140) to control the storage of data to the discs 106 and a read channel (generally designated at 142) to control the retrieval of the data from the discs 106 back to the host computer 126.

The write channel 140 comprises an encoder 144 which, upon receipt of data from the interface circuit 134, encodes the data with run length-limited and error correction code (ECC) encoding to facilitate clock recovery and recovered data integrity. The encoded data are provided to a write controller 146, which serializes the encoded data to generate control signals used by a preamp/driver circuit 148 to apply a time-varying write current to the head 120 to write the encoded data to the disc 106. The preamp/driver circuit 148 is located within the HDA 101, mounted to the actuator 110 as shown in FIG. 1.

The read channel 142 receives readback signals from the head 120 which, after preamplification by the preamp/driver circuit 148, are provided by a multiplexor 150 to an automatic gain control (AGC) circuit 152, which controllably adjusts the amplitudes of the signals to a level appropriate for remaining portions of the read channel 142.

The signals output by the AGC circuit 152 are converted to a sequence of digital samples using an analog-to-digital (A/D) converter 154. A finite response filter (FIR) 156 filters the digital samples to a selected class of partial-response, maximum likelihood (PRML) filtering, such as EPR-4. A Viterbi detector 158 decodes the original encoded sequence from the FIR 154 and a postcoder 160 removes the RLL encoding. Finally, an error correction code (ECC) circuit 162 applies on-the-fly error detection and correction to output the originally stored data to the interface circuit 134 (FIG. 2), for subsequent transfer to the host computer 126. For reference, the operation of the ECC circuit 162 can take place in the interface circuit 134 (FIG. 2).

FIG. 3 further shows the servo circuit 138 to include an AGC 164 which, like the AGC 152, controllably adjusts the amplitudes of readback servo signals read by the head 120 to a level appropriate for remaining portions of the servo circuit 138. A demodulator circuit 166 conditions the readback servo signals, including conversion to digital form, for processing by a digital signal processor (DSP) 168.

The DSP 168 controls the operation of the servo circuit 138 in response to commands issued by the system processor 130 (FIG. 2). During a track following mode of operation, the DSP 168 generates a position error signal (PES) indicative of the position of the head 120 relative to the followed track and, in response to a desired position for the head 120, outputs a current command signal to a coil driver 170 which adjusts the amount of current applied to the coil 113 to maintain the head in a desired relation with the track. During a seek, the DSP 168 applies current to the coil to first accelerate and then decelerate the head 120 from an initial track to a destination track in accordance with a velocity profile, indicative of the desired velocity trajectory for the head during the seek. Programming for the DSP 168 is provided in DSP memory (MEM) 172.

Figure 4:
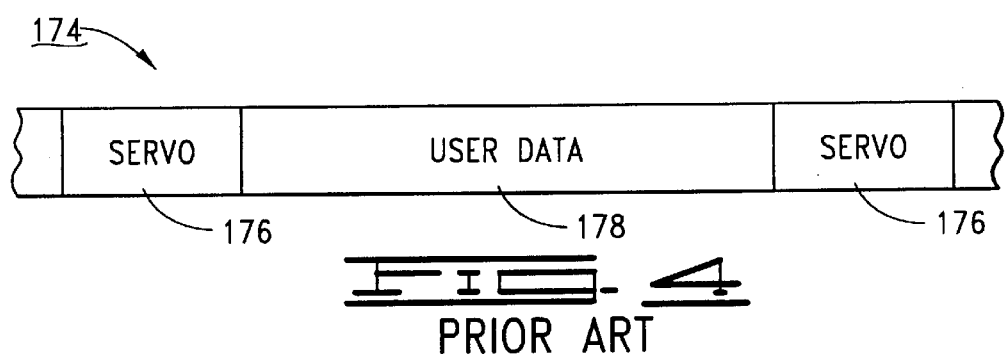
FIG. 4 shows a representation of a portion of a selected track on the disc of FIG. 1.

FIG. 4 provides a schematic representation of a portion of a selected track 174 from the disc 106 (FIG. 1), to illustrate the general manner in which information is stored on the discs. As shown in FIG. 4, the track 174 includes periodically disposed servo fields 176 containing servo information utilized by the servo circuit 138. The servo information is written during disc drive manufacturing using a servo track writer and is generally arranged on each of the discs 106 as radially extending wedges, like spokes on a wheel.

Between each pair of adjacent servo fields 176 is a user data field 178, wherein one or more data sectors are defined during a disc drive formatting operation. User data are thereafter stored to these sectors by the disc drive 100.

Figure 5:
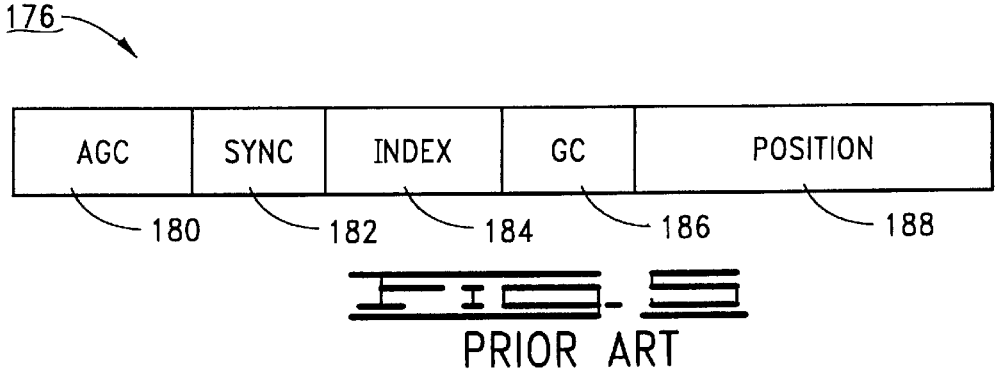
FIG. 5 shows a representation of a selected servo field from FIG. 4.

FIG. 5 provides a view of one of the servo fields 176 in greater detail. The servo field 176 includes an AGC field 180 which includes a 2T repeating timing pattern to enable the AGC 164 of the servo circuit 138 (FIG. 3) to adjust its amplitude to an appropriate level. A synchronization field (sync) 182 includes a unique pattern which enables the servo circuit 138 to identify the servo information. An index field 184 identifies the angular position for the servo field 176 and the Gray code (GC) field 186 identifies the radial position for the servo field 176 by indicating a track address unique to each track. A position field 188 enables the DSP 168 (FIG. 2) to determine the radial position of the head 120 relative to the followed track, as set forth more clearly in FIG. 6.

Figure 6:
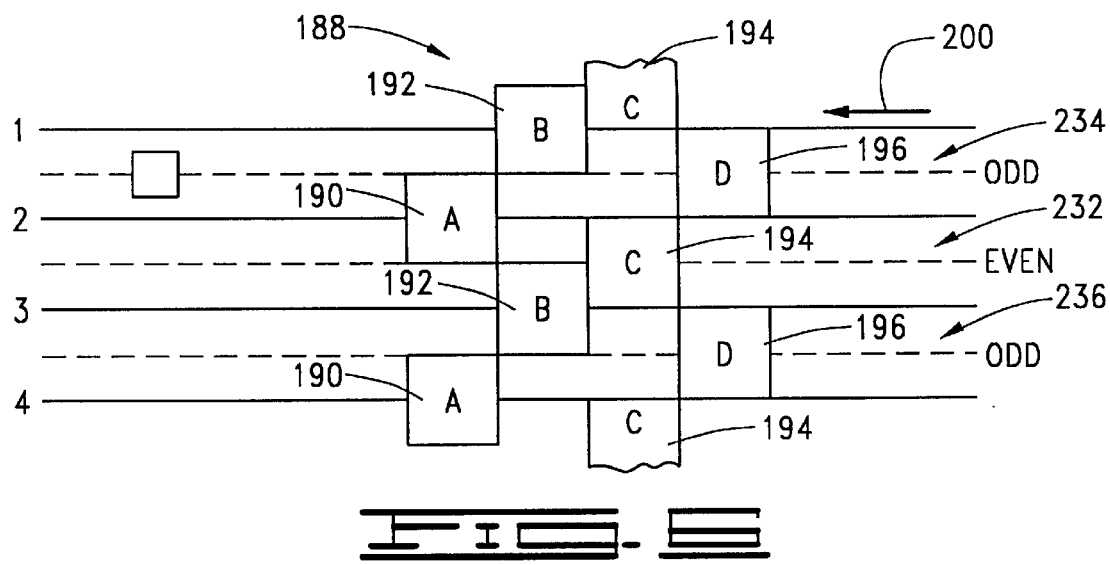
FIG. 6 shows the general configuration of the position fields of FIG. 5 for a number of adjacent tracks on the disc.

FIG. 6 shows the position fields 188 of the servo fields 176 to include a number of position fields, or dibits, preferably arranged in a quadrature (off-set checkerboard) pattern and comprising a repeating series of A, B, C and D fields 190, 192, 194 and 196, respectively. As set forth by FIG. 6, the A and B fields 190, 192 extend from adjacent track centers and the C and D fields 194, 196 extend from adjacent track boundaries. Hence, from the relative magnitudes of the readback signals from the A, B, C and D signals, the DSP 168 can determine the relative position of the head 120 with respect to a particular track being followed. For reference, tracks containing a C field 194 are referred to as "even" tracks and tracks containing a D field 196 are referred to as "odd" tracks. The direction of disc rotation with respect to the head 120 is indicated by arrow 200, and track boundaries demarcated by adjacent C and D fields 194, 196 are numerically identified as 1–4.

Figure 7:
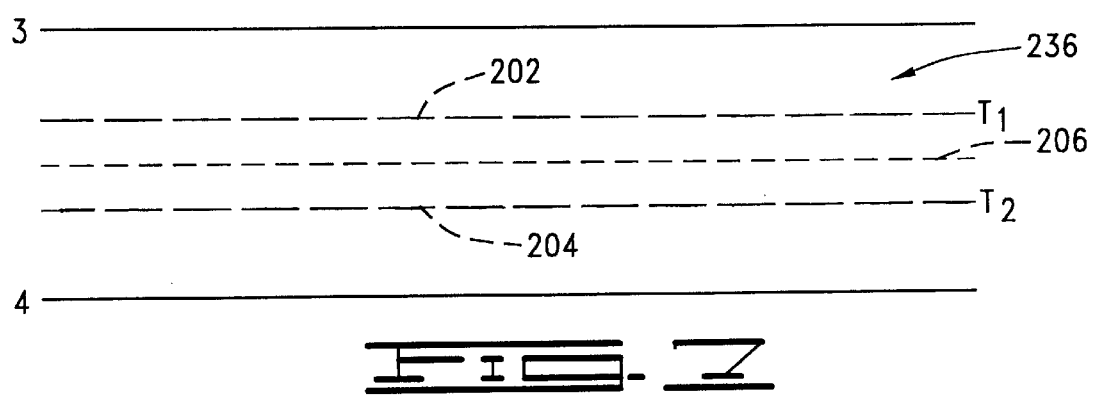
FIG. 7 shows write thresholds at selected radial distances from the center of a selected track from FIG. 6, the write thresholds selected in accordance with preferred embodiments of the present invention.

To minimize the interference of data written to adjacent tracks, write fault thresholds $T_1$, $T_2$ (also referred to as "write thresholds") are identified for each fault, as shown in FIG. 7 and identified at 202, 204, respectively. The write fault thresholds $T_1$, $T_2$ are determined for each track in a manner discussed below to indicate the maximum radial distance (in terms of percentage off-track from track center 206) the head 120 can depart from track center and still safely write data to the particular track.

Figure 8:
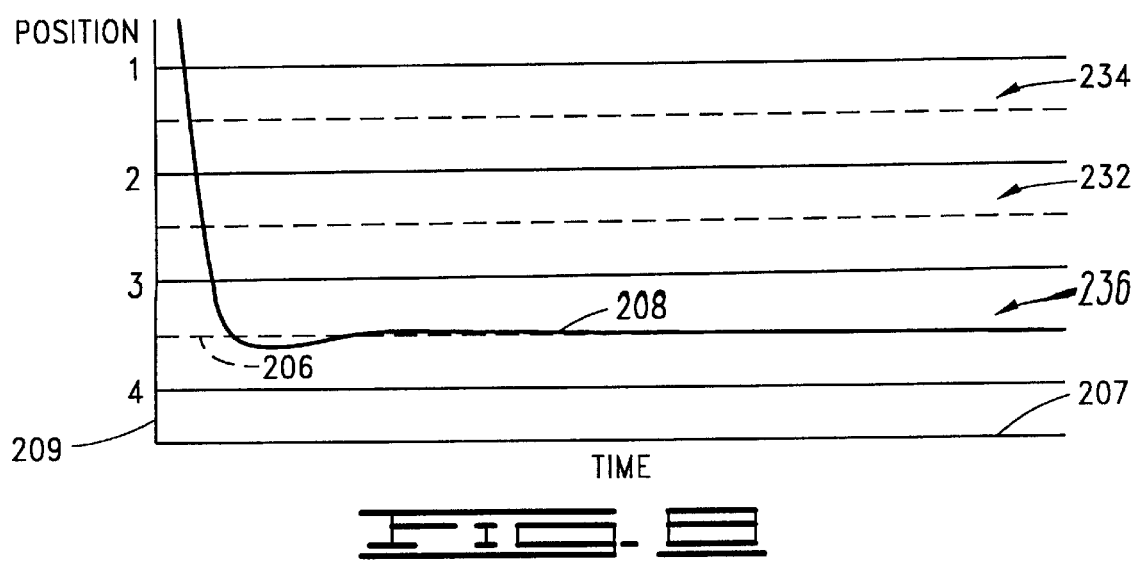
FIG. 8 provides a graphical representation of a velocity trajectory taken by the head at the conclusion of a seek operation to a destination track.
Figure 5:
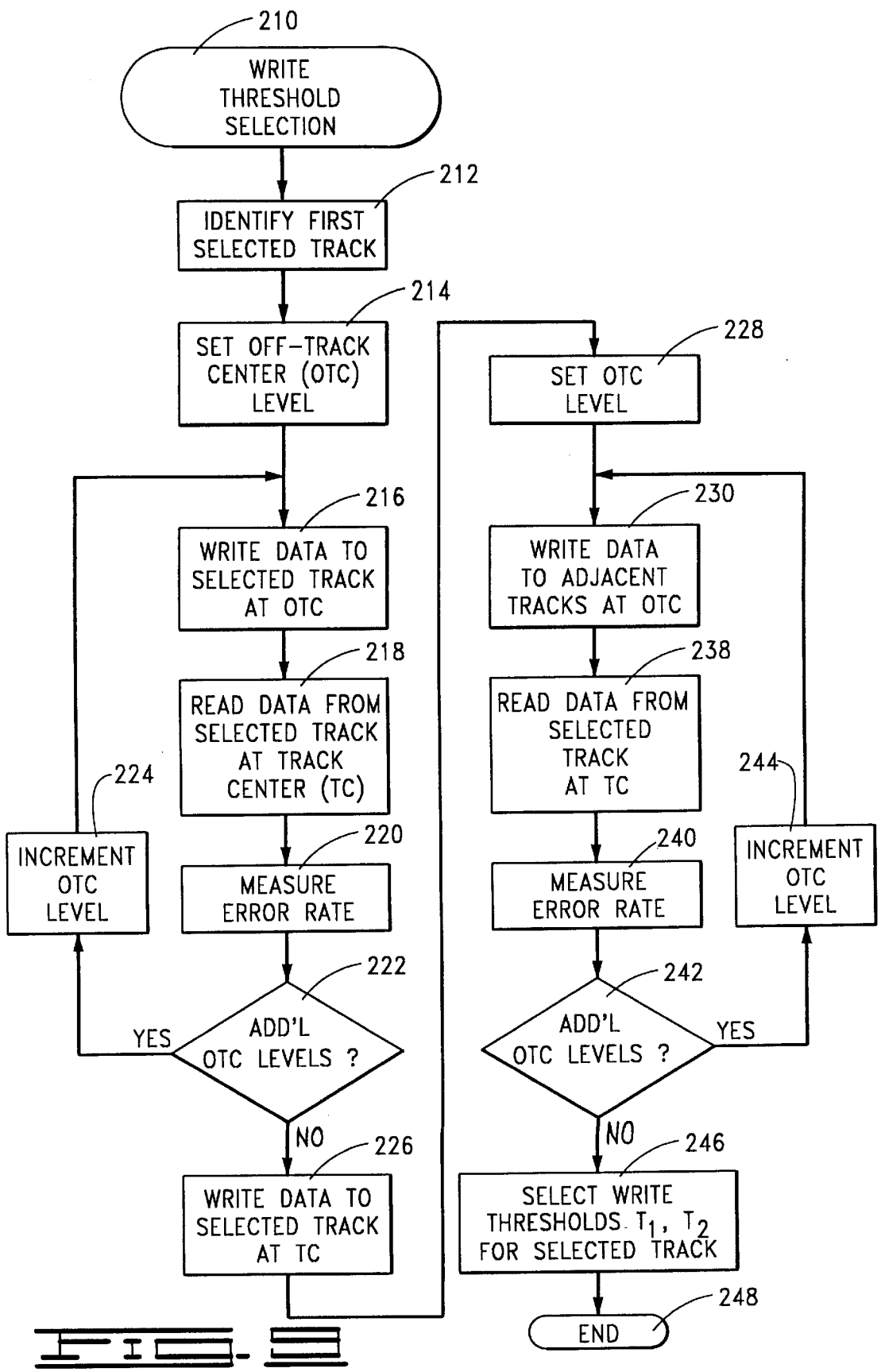

During a track following mode of operation wherein the head 120 is caused to follow the center of a selected track, the servo circuit 138 continually monitors the relative position of the head and declares a write fault at such time that the head moves to a position beyond the write thresholds $T_1$, $T_2$, thereby preventing the sequencer from enabling the communication circuit 136 to initiate a write operation to the discs 106 (or causing the interruption of an on-going write operation). Likewise, as shown by FIG. 8, when a write operation is to occur upon a destination track accessed at the conclusion of a seek to the destination track, the head generally follows a settle profile as set forth by FIG. 8 by head velocity trajectory 208, plotted against a time x-axis 207 and a position y-axis 209. Thus, the servo circuit 138 prevents writing to the destination track until such time that the head has been settled upon the destination track within the associated write fault thresholds shown in FIG. 7.

The manner in which the write thresholds are selected for each of the tracks on the discs 106 will now be set forth by FIG. 9, which illustrates a WRITE THRESHOLD SELECTION routine 210 indicative of programming stored in MEM 132 and utilized by the system processor 130 in controlling the operation of the servo circuit 138. It will be recognized that the routine of FIG. 9 is desirably performed during disc drive manufacturing, but can also be performed from time to time during field operation of the disc drive 100 to maintain optimal operation of the drive.

As shown in FIG. 9, the first step involves the identification of a selected track for which the write thresholds $T_1$, $T_2$ are to be determined, as indicated by step 212. At this point it will be understood that the routine 210 is preferably performed for a selected track from each of a plurality of constant bit-density zones defined upon the discs using conventional zone based recording (ZBR) techniques such as discussed in U.S. Pat. No. 4,799,112 issued Jan. 17, 1989 to Bremmer et al., assigned to the assignee of the present invention. When ZBR is employed, the tracks are grouped into a plurality of zones with each of the tracks in each zone having a common data storage capacity (i.e., the same number of data sectors). Thus, in a preferred embodiment, each of the tracks in each zone will be assigned the same write thresholds. Of course, different zones will have different write thresholds.

Alternatively, as desired the routine of FIG. 9 can be individually performed for each track on each of the recording surfaces of the discs 106, or can be performed on a track at the inner and outer diameters of the discs 106 to allow the use of subsequent interpolation techniques to determine appropriate write thresholds for each of the intermediary tracks. In this case each track will have its own set of write thresholds.

Regardless, once the selected track is identified by step 212, the routine of FIG. 9 initiates what is referred to as a "narrow head" test, to evaluate whether the head 120 is a relatively narrow head (that is, whether the effective width of the head can be considered to be relatively small as compared to the width of the tracks). At step 214, an initial off-track center (OTC) level is selected, such as 10%. The routine continues at step 216 wherein the head is positioned at the selected OTC level and test data are written to selected user data fields (178, FIG. 4) of the selected track by the head 120. Once this test data are written, the routine next positions the head 120 back over the track center (TC, such as 206, FIG. 7) of the selected track and attempts to read the test data, as indicated by step 218. During the reading of this test data (which desirably occurs over a number of revolutions of the disc 106), an error rate is measured, step 220. More particularly, the read channel 142 (FIG. 3) recovers the test data and determines the number of errors detected by the ECC circuit 162.

The routine of FIG. 9 next determines whether additional OTC levels should be evaluated at decision step 222. In one preferred embodiment, a predetermined set of OTC levels is identified (such as 10, 12, 14, 16, 18 and 20 percent), so that the routine sequentially cycles through these increments in OTC level; alternatively, the routine continues until a selected level of error rate is obtained. At such time that additional OTC levels are to be evaluated, the routine passes from decision step 222 to block 224 wherein the OTC level is incremented and the routine repeats steps 216 through 220. The resulting error rates are temporarily stored in MEM 132 (FIG. 2).

Once the narrow head test is completed, the routine of FIG. 9 next performs a wide head test, to determine whether the effective width of the head is relatively "wide" with respect to the width of the tracks. To do so, the routine continues at step 226 wherein the head 120 is caused to write test data to the selected track with the head positioned at track center (TC). Next, an initial off-track center (OTC) level is selected, step 228, and the head writes data to adjacent tracks at the selected OTC level in a direction toward the selected track, as set forth by step 230. By way of example, with reference back to FIG. 6 and considering the selected track to be the track disposed between track boundaries 2 and 3 (identified at 232), the adjacent tracks to which the data are written are the adjacent tracks identified as the tracks disposed between track boundaries 1 and 2 (identified at 234) and between track boundaries 3 and 4 (identified at 236), respectively.

Once the test data have been written to the adjacent tracks, the routine of FIG. 9 continues to step 238 wherein the head 120 reads back the data from the selected track that was previously written at step 226. The resulting error rate is evaluated at step 240 (and the results are stored in MEM 132, FIG. 2).

Decision step 242 determines whether additional OTC levels should be evaluated (in a manner similar to discussed above for decision step 222); if so, the routine passes to step 244 wherein the next OTC level is selected and the steps 230 through 240 are performed again for the next OTC level. In this way, the effects of data written to adjacent tracks can be evaluated.

Finally, when all of the OTC levels have been selected, the routine passes from the decision step 242 to step 246 wherein the particular write thresholds $T_1$, $T_2$ for the selected track are selected based upon the error rates determined at steps 220, 240, after which the routine ends at step 248. The write thresholds are preferably stored in a table in MEM 172 for subsequent access by the DSP 168 during servo operation, as explained below.

Figure 10:
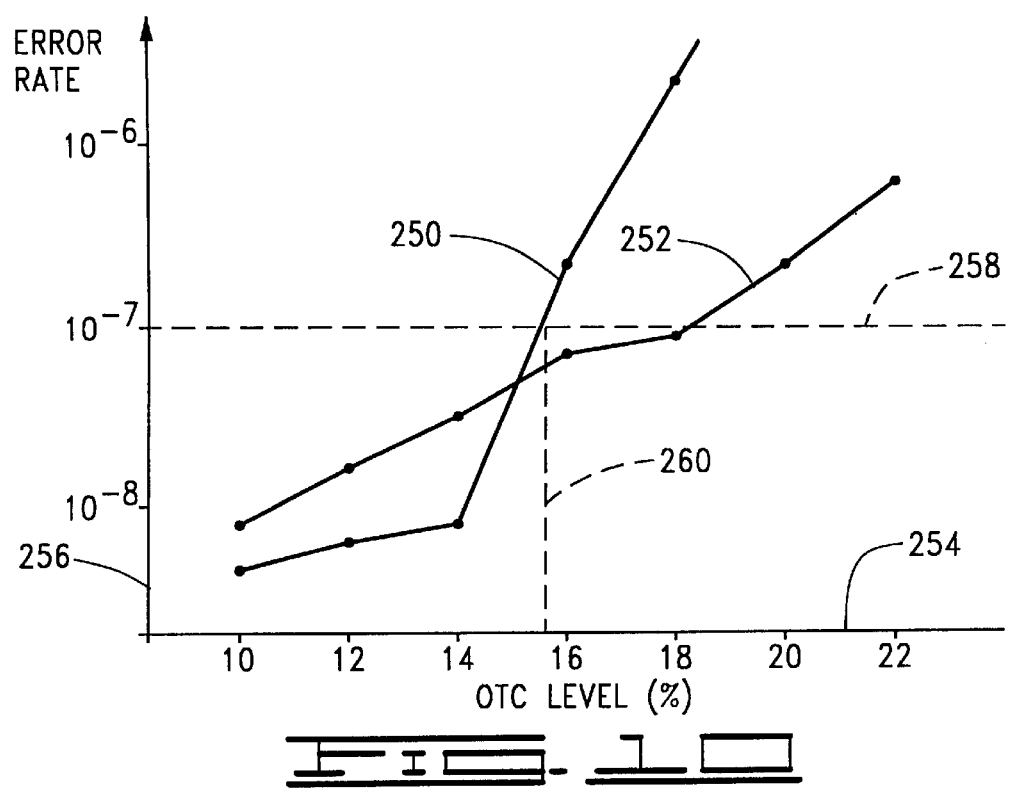
FIG. 10 provides a graphical representation of error rate data obtained from the routine of FIG. 9.

The manner in which step 246 operates to select the final write thresholds $T_1$, $T_2$ for the selected track can be better understood from a review of FIG. 10, which shows a graphical representation of the error rate data obtained from steps 220, 240 of FIG. 9. More particularly, FIG. 10 plots a first error rate curve 250 and a second error rate curve 252 against an x-axis 254 indicative of OTC level and a y-axis 256 indicative of error rate. In the spirit of presenting a preferred embodiment, dotted line 258 represents an acceptance threshold at $10^{-7}$, which corresponds to a measured error rate of $1 \times 10^{-7}$ errors per bit read (errors/bit). Of course, the particular error rate threshold will be selected from the constraints of a given application and may not necessarily be the threshold indicated by the line 258.

As shown in FIG. 10, the first error rate curve 250 (which for purposes of illustration is contemplated as arising from the error rate data obtained by the operation of step 220 of FIG. 9) shows a relatively flat response through OTC levels up to 14%, after which a rapid deterioration in error rate performance occurs. Correspondingly, the second error rate curve 252 (which is contemplated as arising from the error rate data obtained by the operation of step 240 of FIG. 9) shows a relatively linear response for OTC levels from 10% to 22%.

From the curves 250, 252, it will be recognized that the head 120 can be characterized as a relatively narrow head, in that the head provided relatively linear, controlled error rate performance for the wide head test (as indicated by curve 252) but quickly deteriorated during the narrow head test (as indicated by the upward trend in the curve 250 for OTC levels greater than 14%). In other words, the head is not particularly affected by data written to adjacent tracks, but begins to dramatically lose its ability to reliably recover data from the selected track when the head is moved off-track too far beyond a level of around 14%.

From the data obtained from the operation of steps 220, 240 of the routine of FIG. 9, the step 246 will select write thresholds $T_1$, $T_2$ that ensure the head 120 can reliably recover data from the selected track. In a preferred embodiment, the step 246 operates to move in a direction to the right from the y-axis 256 along the predetermined acceptance threshold 258 until the first curve (in the present example, curve 250) is reached, and the corresponding point on the first curve is identified; thus, in this case, a value of about 15.6%, as indicated by dotted line 260. Of course, other criteria might be used, such as changes in slope of the curves 250, 252, to determine the appropriate thresholds $T_1$, $T_2$. In this case, the thresholds might be more conservatively selected at around 14%, the point at which the slope of curve 250 drastically increases.

Figure 11:
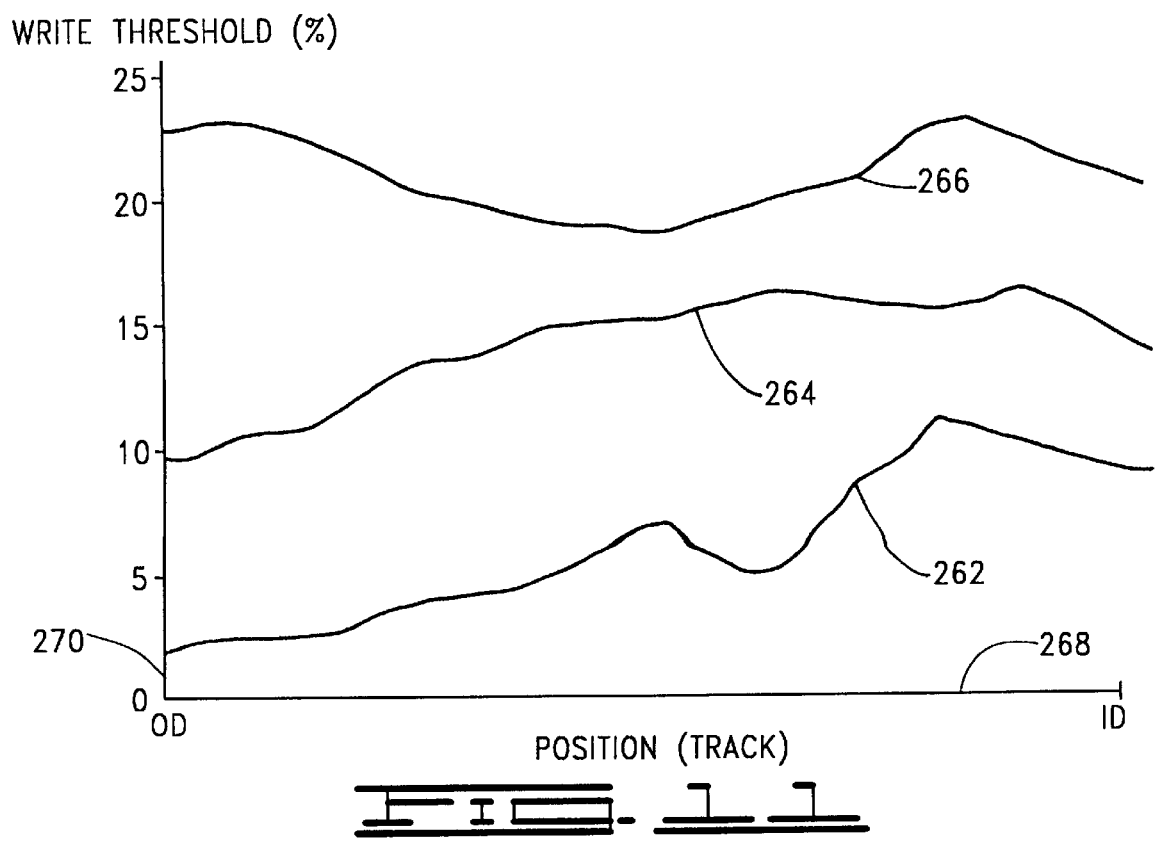
FIG. 11 is a graphical representation of write thresholds for three different heads of the disc drive.

FIG. 11 sets forth the results of write thresholds for three different heads (substantially similar to the head 120 discussed above) in the disc drive 100, to illustrate a range of different write thresholds that might be obtained for a particular drive. More particularly, FIG. 11 shows three different write threshold curves 262, 264 and 266, which are plotted against an x-axis 268 indicative of track position from outer diameter (OD) to inner diameter (ID) on a selected disc 106 and a y-axis 270 indicative of write threshold level.

The first write threshold curve 262 shows variation in write thresholds from about 2% at the OD to about 8% at the ID. As will be recognized, it is questionable whether this particular head possesses sufficient write characteristics to warrant use in the drive, and would likely be replaced during manufacturing of the drive. The second write threshold curve 264, intended to represent a moderate response, has minimum write thresholds for tracks at the OD of around 9%, maximum write thresholds at around 15% for intermediary tracks, and write thresholds of around 12% at the ID. This head would likely be used in the disc drive 100 and would provide acceptable error rate performance, but would also likely result in a higher number of declared write faults and slower access times, due to the relatively tight write tolerances required for the head. Finally, the third write threshold curve 266 exhibits relatively good performance, allowing use of relaxed write thresholds of around 23% at the OD and about 20% at the ID.

Thus, by individually setting the write thresholds for each head on a track by track basis, overall data transfer performance of the drive can be enhanced, by allowing the use of marginal heads that might otherwise fail to meet a standard write threshold and capitalizing on the ability of certain, good heads to reliably write data at greater write thresholds. The routine of FIG. 9 can also be utilized to identify and replace marginal heads (such as represented by the curve 262) which might not be otherwise detected during disc drive manufacturing screening processes.

To review the manner in which the individually selected write thresholds $T_1$, $T_2$ are utilized during normal operation of the drive, reference is made to FIG. 12, which sets forth a flow chart for a WRITE OPERATION routine 280, representative of programming stored in MEM 132 and utilized by the system processor 130 (FIG. 2).

At such time that a write operation is desired upon a selected user data field (178, FIG. 4), the servo circuit 138 operates to position the head 120 over the selected track containing the selected user data field, step 282, after which the sequencer (of the interface circuit 134, FIG. 2) waits for verification from the servo circuit 138 that the head 120 is within the particular write thresholds $T_1$, $T_2$ selected for the track. As shown by step 284, the DSP 168 recalls the associated write thresholds $T_1$, $T_2$ from MEM 172, determines whether the position of the head 120 falls within said thresholds, and provides an affirmative indication to the sequencer when such is the case. The sequencer then commences the assertion of a write gate signal, enabling the write channel 140 (FIG. 3) to write the data to the user data field 178, step 286. The routine then ends at step 288. Although not explicitly shown in FIG. 12, the sequence correspondingly disables the write operation if the write thresholds are exceeded.

Having concluded a review of a preferred embodiment of the present invention, additional considerations will now be addressed. First, for read channels employing the use of a quality monitor (such as set forth at 302 in FIG. 13), the output of the quality monitor can be used in lieu of a calculation of error rate as discussed above with the operation of steps 220, 240 of FIG. 9.

More particularly, FIG. 13 sets forth a portion of a read channel 300 generally similar to the read channel 142 of FIG. 3, including a Viterbi detector 158 and a postcoder 160, with the quality monitor disposed therebetween. As will be recognized by those skilled in the art, the output from the Viterbi decoder 158 will optimally comprise a data sequence corresponding to the encoded data originally written to the selected track. This sequence is provided to the channel quality monitor 302 which performs a running assessment of the channel quality using error values provided by the Viterbi decoder 158. The channel quality monitor 302 generates a status byte which represents the integral, or sum, of the square of the sampled data bit error values recovered during the read operation. The magnitude of this status byte ("channel quality measurement") is representative of the overall quality of the data signal during the read event; the lower the magnitude, the higher the quality of the signal. Because the individual sample errors are squared, larger errors generally carry much more significance than smaller errors in the overall count.

In a preferred embodiment, the A/D converter 154 (FIG. 3) produces sample values over a symmetrical integer range (−18 to +18), and each sample received by the Viterbi decoder 158 will have one of three values corresponding to symbol values of −1, 0 and +1(−14, 0, or +14). Thus, samples other than these will have non-zero error values. Accordingly, the Viterbi decoder 158 provides these error values to the channel quality monitor 302, which accumulates the same in a summing register (identified at $Q_m$ in FIG. 13) to generate the channel quality measurements. The summing register $Q_m$ can thereafter be periodically polled by the system processor 130.

It is advantageous to linearly scale the squared error values before being summed and then to linearly scale the resulting sum, so that the measurement fits in a single-byte register. When a new sector of data is read, the channel quality monitor 302 typically clears the summing register during receipt of the associated phase-locked loop (PLL) recovery field and then begins adding the calculated squares of the error values when data recovery begins. As desired, a root mean squared (RMS) integral of error can readily be determined for the quality measurement by further dividing the sum by the total number of bits received and then taking the square root of this value. It will be recognized that various methodologies for calculating channel quality measurements are well known in the art.

Through experimentation, the relationship between the channel quality measurement and the overall channel read error rate can be readily identified.

An advantage of use of the quality monitor 302 is that substantially less data need be read to obtain a corresponding assessment of overall error rate of the channel 300.

Another consideration is the use of non-uniform write thresholds $T_1$, $T_2$.

While the foregoing discussion has contemplated each set of write thresholds $T_1$ and $T_2$ being disposed at equal radial distances from the center of the associated track, it will be readily apparent that the routine of FIG. 9 can be performed to separately determine write thresholds that are at different radial distances from track center, as desired. An advantage of using such non-uniform write thresholds $T_1$, $T_2$ is the potential for further improvements in disc drive operation, but at the expense of requiring additional storage capacity to handle a corresponding larger number of threshold values for the tracks.

In summary, the present invention is directed to a method for optimizing disc drive write performance through the selection of optimum write thresholds.

As exemplified by a preferred embodiment, a disc drive 100 has a head 120 which is controllably positionable adjacent each of a plurality of nominally concentric tracks 174, 232, 234, 236 defined on a rotatable disc 106, which selectively magnetizes the tracks to write data to the tracks.

A narrow head detection test is first applied whereby data are written to a selected track while maintaining the head at a first off-track center distance (step 216, FIG. 9). The data are read while maintaining the head at a position nominally over the center of the selected track and measuring resulting read error performance (steps 218, 220). These steps are then repeated using a second off-track center distance (steps 224, 216, 218, 220). A wide head detection test is next applied, by writing data to the selected track while maintaining the head over the center of the selected track (step 226), writing data to an adjacent track abutting the selected track while maintaining the head at a third off-track center distance (step 230), and reading the data while maintaining the head over the center of the selected track and measuring resulting read error performance (steps 238, 240). These steps are then repeated using a fourth off-track center distance. The optimum write thresholds are thereafter selected from the measured read error rates (step 248).

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A method for selecting optimum write thresholds for a disc drive of the type having a controllably positionable head adjacent tracks defined on a recording surface of a rotatable disc, wherein the disc drive subsequently inhibits writing of data when the head is disposed at positions beyond the write thresholds, the method comprising steps of:

(a) writing data to a selected track while maintaining the head at a position away from a center of the selected track equal to a first off-track center distance;

(b) reading the data written in step (a) while maintaining the head at a position nominally over the center of the selected track and measuring resulting read error performance;

(c) repeating steps (a) and (b) using a second off-track center distance; and (d) selecting the optimum write thresholds for the selected track from the measured read error performance for the first and second off-track center distances.

2. The method of claim 1, further comprising steps of:

(e) writing data to the selected track while maintaining the head at a position over the center of the selected track;

(f) writing data to an adjacent track abutting the selected track while maintaining the head at a position away from a center of the adjacent track equal to a third off-track center distance; and (g) reading the data written in step (e) while maintaining the head at a position over the center of the selected track and measuring resulting read error performance, (h) repeating steps (e) through (g) using a fourth off-track center distance; and (i) further selecting the optimum write thresholds using the third and fourth off-track center distances.

3. The method of claim 2, further comprising:

(j) repeating steps (a) through (i) for a second selected track on the disc to obtain optimum write thresholds for the second selected track.

4. The method of claim 2, wherein the disc drive is characterized as utilizing zone based recording so that the tracks are grouped into a plurality of zones with each of the tracks in each zone having a common data storage capacity, and wherein steps (a) through (i) are repeated for a selected track from each zone to obtain optimum write thresholds for each of the tracks in each zone.

5. The method of claim 1, wherein the measuring of the resulting read error performance comprises determining a read error rate from read errors detected by an error correction code circuit of a read channel of the disc drive.

6. The method of claim 1, wherein the measuring of the resulting read error performance comprises obtaining quality monitor measurements from a quality monitor of a read channel of the disc drive.

7. The method of claim 1, wherein the disc drive is characterized as utilizing zone based recording so that the tracks are grouped into a plurality of zones with each of the tracks in each zone having a common data storage capacity, and wherein steps (a) through (d) are repeated for a selected track from each zone to obtain optimum write thresholds for each of the tracks in each zone.

* * * * *